United States Patent
LaRoche et al.

(10) Patent No.: US 11,866,049 B1
(45) Date of Patent: *Jan. 9, 2024

(54) POWERTRAIN TORQUE CONTROL DURING A TRANSMISSION SHIFT

(71) Applicant: FORD GLOBAL TECHNOLOGIES, LLC, Dearborn, MI (US)

(72) Inventors: Cory Benson LaRoche, Commerce Township, MI (US); Bradley Dean Riedle, Northville, MI (US); Stephen Michael Cicala, Dearborn Heights, MI (US); Jianping Zhang, Ann Arbor, MI (US); Eric Frank Banners, Plymouth, MI (US); Mehran Namazkar, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/989,297

(22) Filed: Nov. 17, 2022

(51) Int. Cl.
*B60W 10/06* (2006.01)
*B60W 30/19* (2012.01)
*B60W 10/10* (2012.01)

(52) U.S. Cl.
CPC ............ *B60W 30/19* (2013.01); *B60W 10/06* (2013.01); *B60W 10/10* (2013.01); *B60W 2510/0638* (2013.01); *B60W 2510/102* (2013.01); *B60W 2510/1015* (2013.01); *B60W 2710/0644* (2013.01); *B60W 2710/0666* (2013.01)

(58) Field of Classification Search
CPC .... B60W 30/184; B60W 30/19; B60W 10/06; B60W 1/10; B60W 2510/038; B60W 2710/0644; B60W 2710/0666; B60W 2510/1015; B60W 2510/102; B60W 2510/017; F16H 59/18; F02D 41/0087; F02D 41/0215; F02D 41/02; F02D 41/023; F02D 2200/502
USPC ...................................... 701/54; 47/102, 109
See application file for complete search history.

(56) References Cited

U.S. PATENT DOCUMENTS

| | | |
|---|---|---|
| 5,129,286 A | 7/1992 | Nitz et al. |
| 6,434,466 B1 | 8/2002 | Robichaux et al. |
| 7,426,915 B2 | 9/2008 | Gibson et al. |
| 8,352,133 B2 | 1/2013 | Hopp |

(Continued)

OTHER PUBLICATIONS

Claims for U.S. Appl. No. 17/977,397 (Year: 2023).*

*Primary Examiner* — Roger L Pang
(74) *Attorney, Agent, or Firm* — Vincent Mastrogiacomo; Brooks Kushman P.C.

(57) ABSTRACT

A vehicle includes an engine, a transmission, and a controller. The transmission is configured to transfer power from the engine to at least one drive wheel to propel the vehicle. The controller programmed to, in response to a command to shift the transmission, reduce a torque of the engine from a desired engine torque to a reduced value based on a flare at an input to the transmission during the shift. The controller is further programmed to, in response to the reduced value exceeding a threshold, retard an engine spark and maintain operation of all cylinders of the engine to reduce the torque of the engine during the shift. The controller is further programmed to, in response to the reduced value being less than the threshold, retard the engine spark and shutdown at least one cylinder of the engine to reduce the torque of the engine during the shift.

19 Claims, 3 Drawing Sheets

(56) References Cited

U.S. PATENT DOCUMENTS

| | | | |
|---|---|---|---|
| 8,473,172 B2 | 6/2013 | Gibson et al. | |
| 8,721,498 B2 | 5/2014 | Schang et al. | |
| 9,393,954 B2 | 7/2016 | Gibson et al. | |
| 9,404,575 B2 | 8/2016 | Somerville et al. | |
| 9,523,341 B2 * | 12/2016 | Doering | B60W 20/10 |
| 10,871,140 B1 | 12/2020 | Christensen et al. | |
| 10,967,847 B2 * | 4/2021 | Seo | B60K 6/48 |
| 11,097,721 B1 | 8/2021 | Zhao et al. | |
| 2011/0270509 A1 * | 11/2011 | Whitney | F02D 41/1497 |
| | | | 123/406.12 |
| 2013/0296117 A1 * | 11/2013 | Shelton | B60W 30/19 |
| | | | 477/3 |
| 2015/0047607 A1 | 2/2015 | Glugla et al. | |
| 2018/0194355 A1 * | 7/2018 | Tsuda | B60W 30/188 |

\* cited by examiner

US 11,866,049 B1

POWERTRAIN TORQUE CONTROL DURING A TRANSMISSION SHIFT

TECHNICAL FIELD

The present disclosure relates to vehicles having powertrains that include engines and transmissions, and control systems for such powertrains.

BACKGROUND

Vehicles may include transmissions that are configured to deliver power from an engine to one or more drive wheels.

SUMMARY

A vehicle includes an engine, a transmission, and a controller. The engine is configured to generate power. The transmission is configured to transfer power from the engine to at least one drive wheel to propel the vehicle. The controller is programmed to, in response to a command to shift the transmission and a corresponding command to decrease a torque of the engine to a first value that (i) is based on a flare at an input to the transmission and (ii) is greater than a threshold, retard an engine spark and maintain operation of all cylinders of the engine to reduce the torque of the engine during the shift. The controller is further programmed to, in response to the command to shift the transmission and a corresponding command to decrease the torque of the engine to a second value that (i) is based on the flare at an input to the transmission and (ii) is less than the threshold during the shift, retard the engine spark and shutdown at least one cylinder of the engine to reduce the torque of the engine during the shift.

A vehicle includes an engine, a transmission, an accelerator pedal, and a controller. The engine is configured to generate power. The transmission is configured to transfer power from the engine to at least one drive wheel to propel the vehicle. The transmission has a plurality of clutches configured to shift the transmission between a plurality of gear ratios. The accelerator pedal is configured to generate a command corresponding to a desired engine torque in response to depression of the accelerator pedal. The controller programmed to, in response to a command to shift the transmission, reduce a torque of the engine from the desired engine torque to a reduced value based on a flare at an input to the transmission during the shift. The controller is further programmed to, in response to the reduced value exceeding a threshold, retard an engine spark and maintain operation of all cylinders of the engine to reduce the torque of the engine during the shift. The controller is further programmed to, in response to the reduced value being less than the threshold, retard the engine spark and shutdown at least one cylinder of the engine to reduce the torque of the engine during the shift.

A vehicle includes an engine, a transmission, and a controller. The engine is configured to generate power. The transmission is configured to transfer power from the engine to at least one drive wheel to propel the vehicle. The controller is programmed to, in response to a command to shift the transmission and a corresponding command to decrease a torque of the engine to less than a threshold corresponding to a spark retard limit during the shift to compensate for flare at an input to the transmission, (i) retard an engine spark at the spark retard limit to reduce the torque of the engine to the threshold and (ii) shutdown at least one cylinder of the engine to further reduce the torque of the engine to less than the threshold during the shift.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
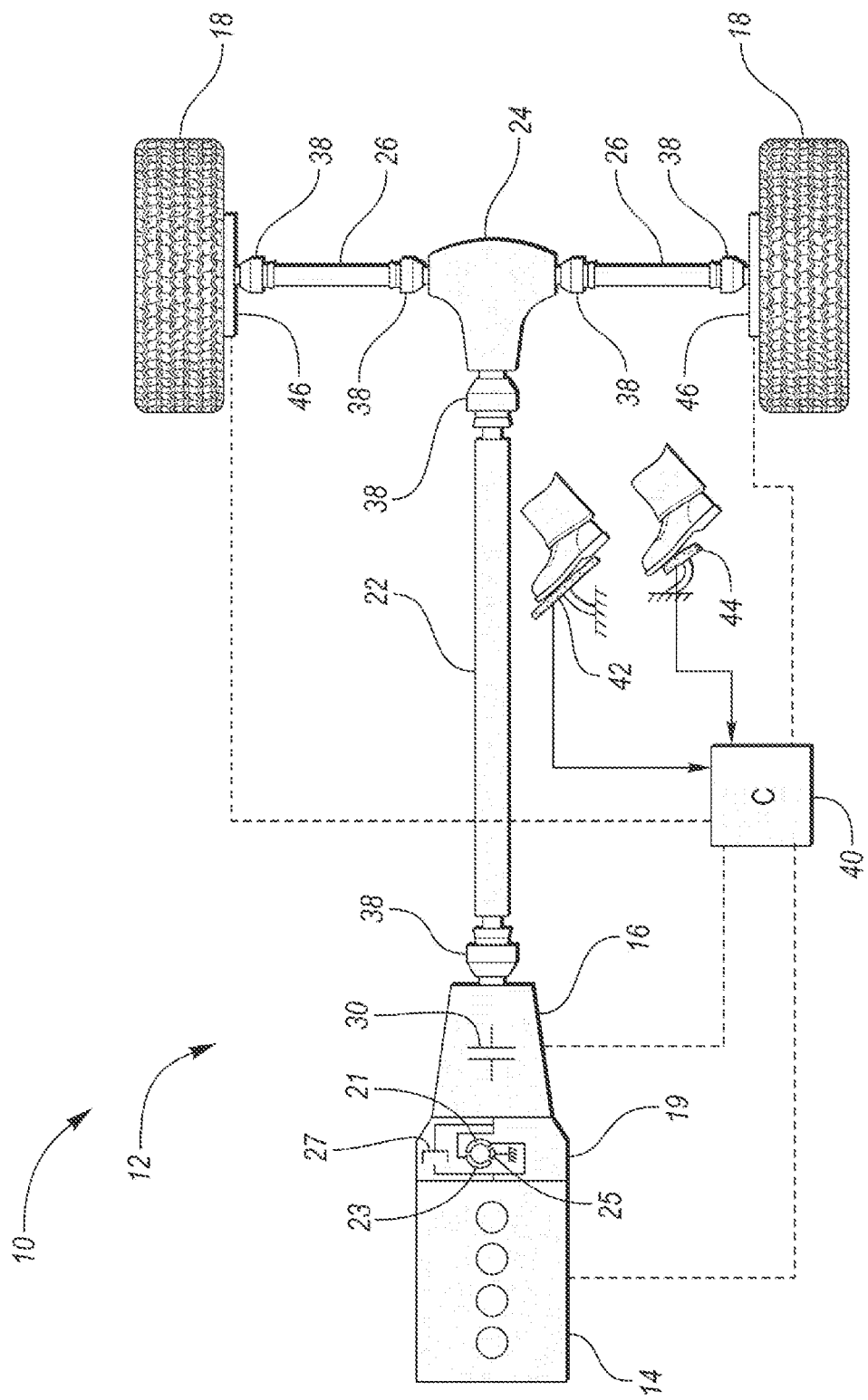
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The engine 14 is configured to generate power. The transmission 16 may be a multiple step-ratio automatic transmission. The powertrain 12 may utilize other power generating components (e.g., electric motors or fuel cells) in addition to the engine 14. The transmission 16 may be configured to provide multiple gear ratios between an input and an output of the transmission 16. The engine 14 is connected to the input of the transmission 16. The transmission 16 is configured to transfer power from the engine 14 to drive wheels 18 to propel the vehicle. More specifically, drivetrain components that are connected to an output of the transmission 16 are configured deliver power from the transmission 16 to the drive wheels 18.

The engine 14 may be connected to an input shaft of the transmission by a torque converter 19 or a launch clutch while an output shaft of the transmission 16 may be connected to a driveshaft 22. The driveshaft 22 may then be connected to a rear drive unit (RDU) 24. The RDU 24 may then be connected to the drive wheels 18 by half shafts 26. The RDU 24 may include a differential and/or one more clutches to control the power output to the wheels 18.

The torque converter 19 includes an impeller 21 fixed to the crankshaft of the engine 14, a turbine 23 fixed to an input shaft to the transmission 16, and a stator 25 that is grounded such that it does not rotate. The torque converter 19 thus provides a hydraulic coupling between the crankshaft of the engine 14 and the input shaft to the transmission 16. The torque converter 19 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 27 may also be provided that, when engaged, frictionally or mechanically couples the impeller and the turbine of the torque converter 19, permitting more efficient power transfer. The torque converter bypass clutch 27 may be configured to transition between an opened (or disconnected) state, a closed (or locked) state, and a slipping state. The rotation of the impeller 21 and the turbine 23 are synchronized when the torque converter bypass clutch 27 is in the closed or locked state. The rotation of the impeller 21 and the turbine 23 are non-synchronized when the torque converter bypass clutch 27 is in the opened state or the slipping state.

The transmission 16 may include gear sets (not shown) that are selectively placed in different gear ratios by selective engagement of friction elements such as clutches to establish the desired multiple discrete or step drive ratios. More specifically, the transmission 16 may have a plurality of clutches 30 configured to shift the transmission 16 between a plurality of gear ratios. The friction elements are controllable through a shift schedule that connects and disconnects certain elements of the gear sets to control the ratio between a transmission output shaft (e.g., driveshaft 22) and the transmission input shaft (e.g., a shaft connected to the crankshaft of the engine 14). The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to driveshaft 22.

The various components of the powertrain 12, including the output shaft of the transmission 16, driveshaft 22, RDU 24, half shafts 26, wheels 18, may be connected to each other, as described above, via constant-velocity joints 38. Constant-velocity joints connect two rotating parts and allow the two rotating parts to rotate about different axes.

Although FIG. 1 depicts a rear-wheel drive vehicle, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle.

The powertrain 12 further includes an associated controller 40 such as a powertrain control unit (PCU). While illustrated as one controller, the controller 40 may be part of a larger control system and may be controlled by various other controllers throughout the vehicle 10, such as a vehicle system controller (VSC). It should therefore be understood that the powertrain control unit 40 and one or more other controllers can collectively be referred to as a "controller" that controls various actuators in response to signals from various sensors to control functions such as starting/stopping engine 14, select or schedule transmission shifts, etc. Controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, transmission gearbox 16, torque converter 19, etc. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component presence, intake air flow (MAF), transmission gear, ratio, or mode, transmission oil temperature (TOT), transmission turbine speed (TS), torque converter bypass clutch 27 status (TCC), or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 42 is used by the driver of the vehicle to provide a desired or demanded torque, power, or drive command to propel the vehicle. In general, depressing and releasing the accelerator pedal 42 generates an accelerator pedal position signal that is representative of an accelerator pedal position and may be interpreted by the controller 40 as a demand for increased power or decreased power, respectively, or as a demand for increased torque or decreased torque, respectively. A brake pedal 44 is also used by the driver of the vehicle to provide a demanded braking torque to slow the vehicle. The brake pedal 44 may configured to actuate friction brakes 46 to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes 46. The controller 40 also controls the timing of gear shifts within the transmission 16 based on one or more shift schedules that may be stored as tables within the controller. The shift schedules may be based on a demanded torque or power output via the accelerator pedal and a speed of the vehicle.

It should be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
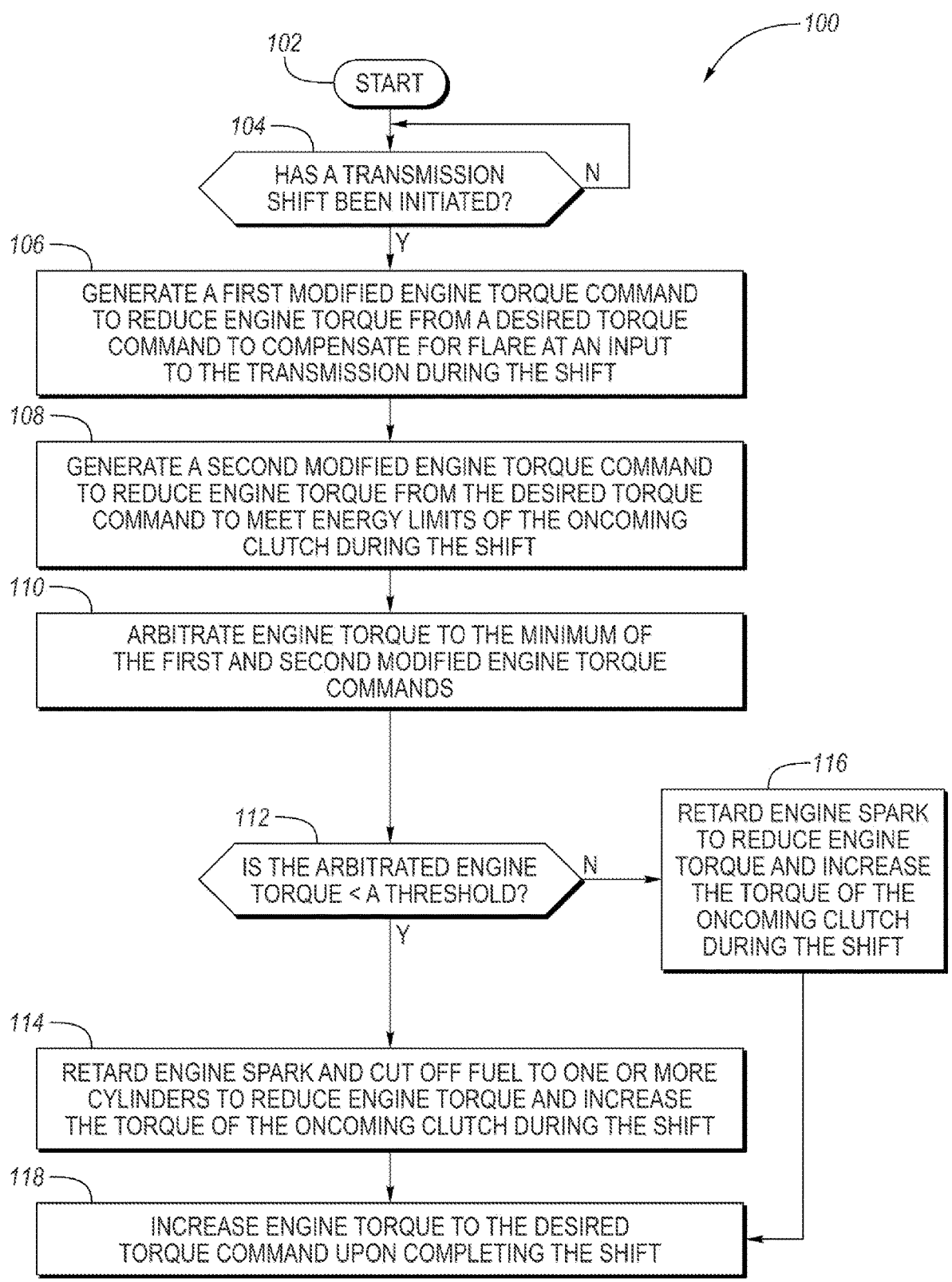
FIG. 2 is a flowchart illustrating a method for controlling the engine during a shift in the transmission.
Figure 3:
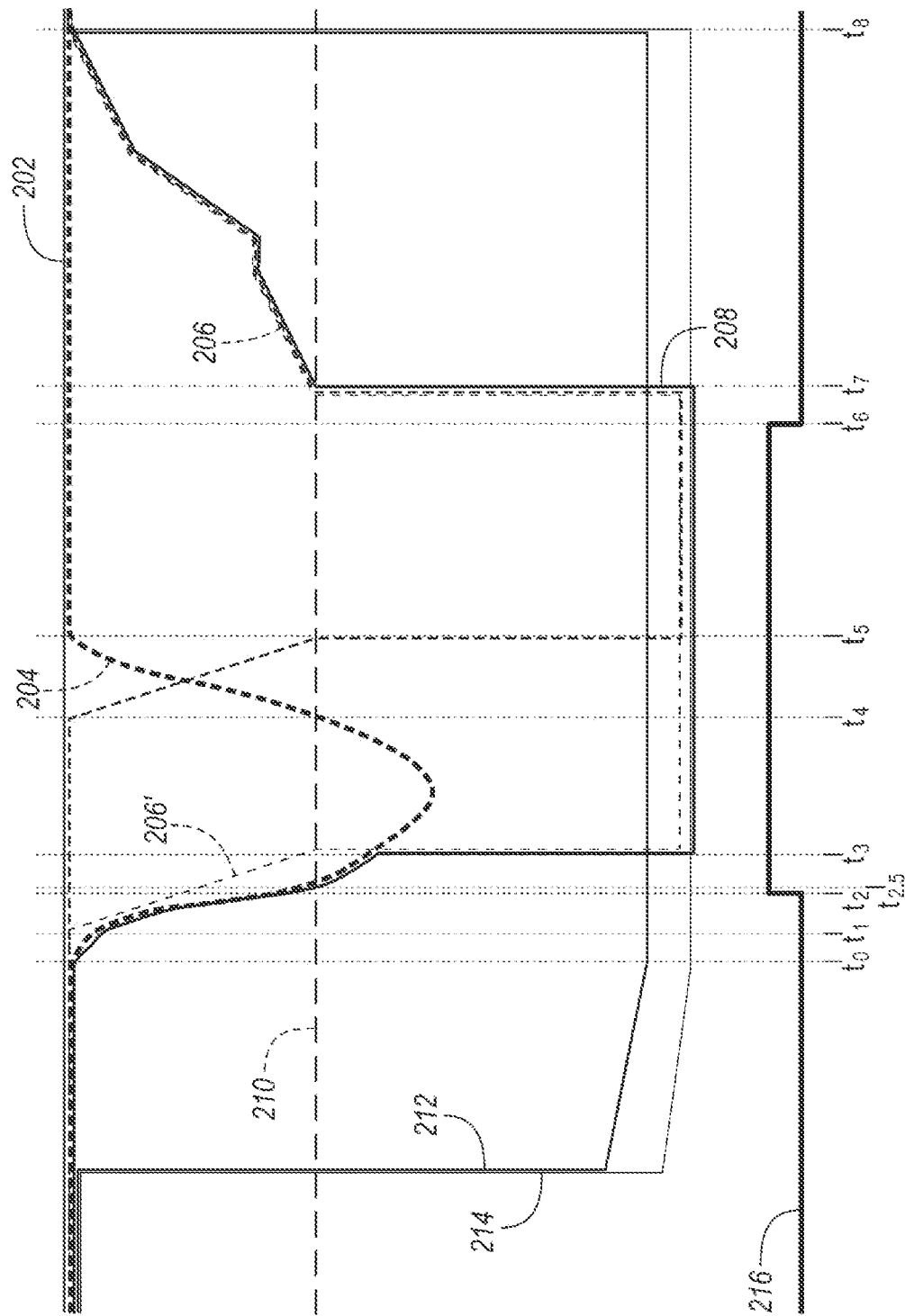
FIG. 3 is a series of graphs illustrating engine torque modification during the shift in the transmission.

Referring to FIGS. 2 and 3, (i) a flowchart of a method 100 for controlling the torque of the engine 14 during a shift in the transmission 16 and (ii) a series of graphs illustrating an engine torque modification during the shift in the transmission 16 are illustrated, respectively. The method 100 and graphs of FIGS. 2 and 3 may be stored as control logic and/or an algorithm within the controller 40. The controller 40 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle 10.

The method 100 next moves on to block 104 where it is determined if a shift in the transmission 16 has been initiated. If a shift has not been initiated, the method 100 returns to the beginning of block 104. If a shift has been initiated, the method 100 moves on to blocks 106 and 108.

At block 106, a primary or first modified engine torque command is generated if a ratio flare is present. The first modified engine torque command is a reduced engine torque command relative to the desired torque command generated by depressing the accelerator pedal 42. The first modified engine torque command is generated based on the ratio flare at an input to the transmission 16. Flare (or shift flare) is slippage or an increase in RPMs at an input of the transmission (which may be determined by an increase in the RPMs of the engine 14, impeller 21, or turbine 23) during a shift between gears during acceleration. More specifically, the first modified engine torque command is generated to reduce the flare at an input to the transmission and may be based on a current flare value (e.g., a deviation from a commanded or desired speed of the engine 14, impeller 21, or turbine 23) and/or a rate of change of the flare. The desired torque command is illustrated as line 202 and the first modified engine torque command is illustrated as line 204 in FIG. 3.

At block 108, a secondary or second modified engine torque command is generated. The second modified engine torque command is a reduced engine torque command relative to the desired torque command generated by depressing the accelerator pedal 42. The second modified engine torque command is generated to meet the energy limits of the oncoming clutch during the shift of the transmission 16. Stated in other terms the torque of the engine 14 needs to be reduced during the shift so that it is within oncoming clutch's capacity and mechanical or thermal limits to receive energy from the engine 14. The second modified engine torque command is illustrated as line 206 in FIG. 3.

The method 100 then arbitrates between the first modified engine torque command 204 and the second modified engine torque command 206 at block 110. More specifically, at block 110, the method 100 controls the torque of the engine 14 such that torque of the engine 14 is reduced during the shift to the minimum of the first modified engine torque command 204 and the second modified engine torque command 206 at block 110. Therefore, it may be stated that the torque of the engine 14 is controlled according to an arbitrated torque at block 110. This may require that that the arbitrated torque of the engine 14 is controlled based on the first modified engine torque command 204 during portions of the shift and is controlled based on the second modified engine torque command 206 during other portions of the shift. For example, the arbitrated torque of the engine is controlled to a value that is represented by line 208 in FIG. 3, where the arbitrated torque of the engine 208 (i) is controlled according to the first modified engine torque command 204 between time $t_0$ (where the shift begins) and time $t_3$ and (ii) is controlled according to the second modified engine torque command 206 between time $t_3$ and time $t_8$.

It is noted that there may be circumstances where the flare control is not required and that under such circumstances, the arbitrated torque of the engine 208 will be controlled according to the second modified engine torque command 206 only during a shift in the transmission 14. Also, under such a circumstance (where the flare control is not required), initiation of the second modified engine torque command 206 may begin at time $t_4$. However, when flare control is required, the shift in the transmission may take more time to complete and the second modified engine torque command 206 may be initiated sooner at time $t_1$ as opposed to time $t_4$, which is illustrated by line 206'.

It further noted that the first modified engine torque command 204 and the second modified engine torque command 206 illustrated in FIG. 3 are examples of a single scenario and that there may be other scenarios where the values of the first modified engine torque command 204 and the second modified engine torque command 206 are greater than or less than what is illustrated in FIG. 3. For example, there may be circumstances where the first modified engine torque command 204 may be less than the second modified engine torque command 206 during the shift of the transmission 14 between times $t_0$ and $t_8$, and under such a circumstance the arbitrated torque of the engine 208 will be controlled according to the first modified engine torque command 204 only during a shift in the transmission 14. As another example, there may be circumstances where the second modified engine torque command 206 may be less than the first modified engine torque command 204 during the shift of the transmission 14 between times $t_0$ and $t_8$, and under such a circumstance the arbitrated torque of the engine 208 will be controlled according to the second modified engine torque command 206 only during a shift in the transmission 14.

Next, the method 100 moves on to block 112 where it is determined if the arbitrated torque of the engine 208 is less than a threshold. The threshold may correspond to a spark retard limit during the shift. More specifically, the spark retard limit may correspond to a maximum amount of spark retard that may be obtained without causing misfire, weak combustion, or an excessive increase in the temperature of the catalytic converter. The spark retard limit may correspond to timing the spark so that the spark occurs when the pistons of the engine 14 are at approximately −3° from top dead center. It is noted that spark may be retarded at any amount up to the spark retard limit. For example, spark may be timed to occur when the pistons of the engine 14 are at top dead center, −3° from top dead center, or any incremental value between top dead center and −3° from top dead center. The threshold corresponding to the spark retard limit is illustrated as line 210 in FIG. 3.

If the arbitrated torque of the engine 208 is less than the threshold 210 (e.g., as illustrated between times $t_{2.5}$ and $t_7$ in FIG. 3), the method 100 moves on to block 114. At block 114, the spark of the engine is retarded at the maximum amount (i.e., at the spark retard limit) and fuel is cut off from at least one of the cylinders of the engine 14 to reduce the torque of the engine 14 from the desired torque command 202 to the arbitrated torque of the engine 208 while the hydraulic pressure of the oncoming clutch is increased. If the arbitrated torque of the engine 208 is not less than the threshold 210 (e.g., if the arbitrated torque of the engine 208 has values that are greater than or equal to the threshold 210 between times $t_{2.5}$ and $t_7$ as opposed to what is shown in FIG. 3), the method 100 moves on to block 116. At block 116, the spark of the engine is retarded at the maximum amount or less than the maximum amount while all of the cylinders of the engine 14 remain operating to reduce the torque of the engine 14 from the desired torque command 202 to the arbitrated torque of the engine 208 while the hydraulic pressure of the oncoming clutch is increased. It is noted that the arbitrated torque of the engine 208 may have values that trace the threshold 210 or values that are greater than the threshold between times $t_{2.5}$ and $t_7$ if the answer at block 112 is NO and the torque of the engine 14 is being controlled according to block 116. After either block 114 or block 116, the method 100 moves on to block 118 where the torque of the engine 14 is increased to the desired torque command 202 once the shift has been completed (e.g., the torque of the engine 14 is ramped to the desired torque command 202 between times $t_7$ and $t_8$ in FIG. 3).

A target torque of the engine 14 during the shift is illustrated by line 212 in FIG. 3. The target torque 212 of the engine 14 is generated once a shift in the transmission 16 has been initiated and is set to compensate for flare and/or to meet the energy limits of the oncoming clutch. If the target torque 212 is less than the threshold 210, the arbitrated torque of the engine 208 is first decreased from the desired torque command 202 at time to $t_0$ the threshold 210 at time $t_{2.5}$. The arbitrated torque of the engine 208 is then further decreased by cutting off fuel to one or more of the cylinders of the engine 14 between times $t_{2.5}$ and $t_7$. The arbitrated torque of the engine 208 is more specifically decreased by cutting off fuel to one or more of the cylinders of the engine 14 between times $t_{2.5}$ and $t_7$ to a modified target torque illustrated by line 214 in FIG. 3.

The modified target torque 214 is utilized to ensure that the correct number cylinders of the engine 14 are shut down at time $t_3$ to ensure the arbitrated torque 208 of the engine 14 decreases to less than or equal to the target torque 212. For example, if shutting down X number of cylinders of the engine 14 will result in the arbitrated torque 208 of the engine 14 being greater than the target torque 212 between times $t_3$ and $t_7$ and shutting down X+1 number of cylinders of the engine 14 will result in the arbitrated torque 208 of the engine 14 being less than the target torque 212 between times $t_3$ and $t_7$ the modified target torque 214 will be structured to correspond to shutting down X+1 number of cylinders. It is also noted that the modified target torque 214 may adjusted to shut down any number of cylinders required to ensure the arbitrated torque of the engine 208 decreases to less than or equal to the target torque 212.

If the arbitrated torque of the engine 208 is greater than or equal to the threshold 210, the arbitrated torque of the engine 208 is decreased from the desired torque command 202 at time $t_0$ to the value of the target torque 212 that is greater than or equal to the threshold 210 and remains at the value of the target torque 212 that is greater than or equal to the threshold 210 until time $t_7$. As the oncoming clutch engages, the arbitrated torque of the engine 208 is then ramped back to the desired torque command 202 between times $t_7$ and $t_8$, regardless if the target torque 212 was less, equal to, or greater than the threshold 210.

A command to shut down one more of the cylinders of the engine 14 is illustrated by line 216 in FIG. 3. The command is off before time $t_2$, is on between times $t_2$ and $t_6$, and is off after time $t_6$ in FIG. 3. The command slightly leads times $t_{2.5}$ (where one or more cylinders of the engine 14 are shutdown according to arbitrated torque of the engine 208) and $t_7$ (where the shutdown cylinders of the engine 14 are turned back on) to compensate for a delay in shutting down and turning on the one or more of the cylinders of the engine 14 at times $t_{2.5}$ and $t_7$, respectively. If the target torque 212 is not less than the threshold 210, the arbitrated torque of the engine 208 will not decrease to less than the threshold 210, all of the cylinders of the engine 14 will remain operating, and the command to shut down one more of the cylinders 216 will also remain off between times $t_2$ and $t_6$.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine configured to generate power;
   a transmission configured to transfer power from the engine to at least one drive wheel to propel the vehicle; and
   a controller programmed to,
      in response to a command to shift the transmission and a corresponding command to decrease a torque of the engine to a first value that (i) is based on a flare at an input to the transmission and (ii) is greater than a threshold, retard an engine spark and maintain operation of all cylinders of the engine to reduce the torque of the engine during the shift, and
      in response to the command to shift the transmission and a corresponding command to decrease the torque of the engine to a second value that (i) is based on the flare at an input to the transmission and (ii) is less than the threshold during the shift, retard the engine spark and shutdown at least one cylinder of the engine to reduce the torque of the engine during the shift.

2. The vehicle of claim 1, wherein the controller is further programmed to, in response to the command to shift the transmission, generate a secondary command to decrease the torque of the engine to a third value that is based on a thermal limit of an oncoming clutch to receive power from the engine.

3. The vehicle of claim 2, wherein the controller is further programmed to,
   in response to the third value exceeding the threshold, control the secondary command to correspond to retarding the engine spark while maintaining operation of all cylinders of the engine, and
   in response to the third value being less than the threshold, control the secondary command to correspond to retarding the engine spark while shutting down at least one cylinder of the engine.

4. The vehicle of claim 3, wherein the controller is further programmed to, in response to (i) the command to shift the transmission and the corresponding command to decrease the torque of the engine to the first value and (ii) the secondary command to decrease the torque of the engine to a third value, reduce the torque of the engine to a minimum of the first and third values during the shift.

5. The vehicle of claim 3, wherein the controller is further programmed to, in response to (i) the command to shift the transmission and the corresponding command to decrease the torque of the engine to the second value and (ii) the secondary command to decrease the torque of the engine to a third value, reduce the torque of the engine to a minimum of the second and third values during the shift.

6. The vehicle of claim 1, wherein the first and second values are based on a rate of change of the flare.

7. The vehicle of claim 1, wherein the first and second values are based on a current value of the flare.

8. The vehicle of claim 1, wherein the controller is further programmed to, in response to completing the shift, increase to the torque of the engine to a desired engine torque.

9. A vehicle comprising:
   an engine configured to generate power;
   a transmission (i) configured to transfer power from the engine to at least one drive wheel to propel the vehicle and (ii) having a plurality of clutches configured to shift the transmission between a plurality of gear ratios;
   an accelerator pedal configured to generate a command corresponding to a desired engine torque in response to depression of the accelerator pedal; and
   a controller programmed to,
      in response to a command to shift the transmission, reduce a torque of the engine from the desired engine torque to a reduced value based on a flare at an input to the transmission during the shift,
      in response to the reduced value exceeding a threshold, retard an engine spark and maintain operation of all cylinders of the engine to reduce the torque of the engine during the shift, and
      in response to the reduced value being less than the threshold, retard the engine spark and shutdown at least one cylinder of the engine to reduce the torque of the engine during the shift.

10. The vehicle of claim 9, wherein the controller is further programmed to, in response to the command to shift the transmission, generate a secondary command to reduce the torque of the engine to from the desired engine torque to a second reduced value that is based on a thermal limit of an oncoming clutch to receive power from the engine.

11. The vehicle of claim 10, wherein the controller is further programmed to,
    in response to the second reduced value exceeding the threshold, control the secondary command to correspond to retarding the engine spark while maintaining operation of all cylinders of the engine, and
    in response to the second reduced value being less than the threshold, control the secondary command to correspond to retarding the engine spark while shutting down at least one cylinder of the engine.

12. The vehicle of claim 11, wherein the controller is further programmed to reduce the torque of the engine to a minimum of the reduced value and the second reduced value during the shift.

13. The vehicle of claim 9, wherein the reduced value is based on a rate of change of the flare.

14. The vehicle of claim 9, wherein the reduced value is based on a current value of the flare.

15. The vehicle of claim 9, wherein the controller is further programmed to, in response to completing the shift, increase the torque of the engine to the desired engine torque.

16. A vehicle comprising:
- an engine configured to generate power;
- a transmission configured to transfer power from the engine to at least one drive wheel to propel the vehicle; and
- a controller programmed to,
  - in response to a command to shift the transmission and a corresponding command to decrease a torque of the engine to less than a threshold corresponding to a spark retard limit during the shift to compensate for flare at an input to the transmission, (i) retard an engine spark at the spark retard limit to reduce the torque of the engine to the threshold and (ii) shutdown at least one cylinder of the engine to further reduce the torque of the engine to less than the threshold during the shift, and
  - in response to the command to shift the transmission and a corresponding command to decrease the torque of the engine to greater than the threshold during the shift to compensate for flare at the input to the transmission, (i) retard the engine spark at less than or equal to the spark retard limit and (ii) maintain operation of all cylinders of the engine to reduce the torque of the engine to greater than the threshold during the shift, wherein the torque of the engine is reduced based on a rate of change of the flare.

17. The vehicle of claim 16, wherein the controller is further programmed to, in response to the command to shift the transmission, generate a secondary command to reduce the torque of the engine based on a thermal limit of an oncoming clutch to receive power from the engine.

18. The vehicle of claim 17, wherein the controller is further programmed to reduce the torque of the engine to a minimum of (i) a first value corresponding to a reduction in the torque of the engine to compensate for flare at the input to the transmission and (ii) a second value corresponding to a reduction in the torque of the engine based on the thermal limit of the oncoming clutch to receive power from the engine.

19. The vehicle of claim 16, wherein the controller is further programmed to, in response to completing the shift, increase the torque of the engine to the desired engine torque.

* * * * *